(12) United States Patent
Lore et al.

(10) Patent No.: US 12,428,153 B2
(45) Date of Patent: Sep. 30, 2025

(54) NEUROMORPHIC SENSOR IMPLEMENTATION IN AIRCRAFT CABIN ENVIRONMENTS

(71) Applicant: B/E Aerospace, Inc., Winston-Salem, NC (US)

(72) Inventors: Kin Gwn Lore, Belmont, MA (US); Ganesh Sundaramoorthi, Duluth, GA (US); Kishore K. Reddy, Farmington, CT (US)

(73) Assignee: B/E Aerospace, Inc., Winston-Salem, NC (US)

( * ) Notice: Subject to any disclaimer, the term of this patent is extended or adjusted under 35 U.S.C. 154(b) by 302 days.

(21) Appl. No.: 18/105,664

(22) Filed: Feb. 3, 2023

(65) Prior Publication Data

US 2024/0262502 A1    Aug. 8, 2024

(51) Int. Cl.
| | | |
|---|---|---|
| *B64D 11/00* | (2006.01) | |
| *A47K 5/12* | (2006.01) | |
| *E03C 1/05* | (2006.01) | |
| *E03D 5/10* | (2006.01) | |
| *H04N 7/18* | (2006.01) | |

(52) U.S. Cl.
CPC ............. *B64D 11/00* (2013.01); *H04N 7/188* (2013.01); *A47K 5/1217* (2013.01); *B64D 2011/0038* (2013.01); *B64D 2011/0053* (2013.01); *E03C 1/057* (2013.01); *E03D 5/105* (2013.01)

(58) Field of Classification Search
CPC ............ B64D 11/00; B64D 2011/0038; B64D 2011/0053; H04N 7/188; A47K 5/1217; E03C 1/057; E03D 5/105
See application file for complete search history.

(56) References Cited

U.S. PATENT DOCUMENTS 9,725,033 B1 *   8/2017   Johannessen ............ B60Q 3/80
10,387,741 B2    8/2019   Zink et al.
(Continued)

FOREIGN PATENT DOCUMENTS

| DE | 102020213560 A1 | 4/2022 |
| EP | 3771648 A1 | 2/2021 |
| WO | 2021214574 A1 | 10/2021 |

OTHER PUBLICATIONS

European Patent Office, Extended European Search Report received in EP Application No. 24155328.8, Jul. 1, 2014, 7 pages.
(Continued)

*Primary Examiner* — Naeem Taslim Alam
(74) *Attorney, Agent, or Firm* — Suiter Swantz IP

(57) ABSTRACT

Systems and methods for implementing neuromorphic sensor technology in aircraft cabin environments including smart devices to improve and/or expand the use and functionality of the smart devices. In some embodiments, neuromorphic sensors and smart devices are communicatively coupled to a controller operative to analyze object movements and instruct smart devices to operate according to preprogrammed instructions. Non-limiting examples include detecting passenger movements in passenger seating areas and lavatories associated with smart devices, detecting movements of smart devices configured to traverse aircraft aisles, etc. The neuromorphic sensors are incapable of capturing visually recognizable passenger identities and therefore satisfy privacy concerns.

15 Claims, 4 Drawing Sheets

(56) References Cited

U.S. PATENT DOCUMENTS

| | | | | |
|---|---|---|---|---|
| 2002/0104159 | A1* | 8/2002 | Nishioka | E03C 1/057 4/623 |
| 2003/0067379 | A1* | 4/2003 | Riley | G06K 17/00 340/5.53 |
| 2017/0113801 | A1* | 4/2017 | Brunaux | B64D 11/00 |
| 2017/0323281 | A1* | 11/2017 | Jones | G06Q 20/203 |
| 2018/0173934 | A1* | 6/2018 | Zink | G06V 40/193 |
| 2019/0337549 | A1* | 11/2019 | Lobo | B62B 5/0096 |
| 2020/0028703 | A1 | 1/2020 | Homsi | |
| 2020/0169844 | A1* | 5/2020 | Forest | H04W 4/024 |
| 2020/0367332 | A1* | 11/2020 | Pearson | B64D 11/00 |
| 2021/0016894 | A1* | 1/2021 | Childress | G05D 1/101 |
| 2021/0031924 | A1* | 2/2021 | Dowty | B60Q 3/00 |
| 2021/0105421 | A1 | 4/2021 | Kukreja et al. | |
| 2021/0209384 | A1* | 7/2021 | Fukuhara | B60W 40/08 |
| 2021/0223779 | A1 | 7/2021 | Passot | |
| 2022/0009439 | A1* | 1/2022 | Campos Macias | G06V 20/44 |
| 2022/0366799 | A1 | 11/2022 | Ryde et al. | |
| 2022/0388661 | A1 | 12/2022 | Balasubramanian et al. | |
| 2023/0002054 | A1* | 1/2023 | Vandewall | B64D 11/0007 |
| 2023/0021408 | A1* | 1/2023 | Cohen-Duwek | G06T 1/0014 |
| 2023/0242123 | A1* | 8/2023 | Lynam | B60W 10/18 701/1 |
| 2023/0290148 | A1* | 9/2023 | Wu | G06V 20/50 |
| 2023/0370571 | A1* | 11/2023 | Zachäus | H04N 23/69 |
| 2024/0109460 | A1* | 4/2024 | Rangel Sanchez | B60N 2/0277 |

OTHER PUBLICATIONS

Kirklanda, Paul et al., Neuromorphic Technologies for Defence and Security, Neuromorphic Sensing Processing Lab, Electronic and Electrical Engineering Department, University of Strathclyde, Glasgow, UK, Leonardo ME, Basildon, UK (circa 2020).

Xperi Develops World-first In-cabin Monitoring Technologies on Neuromorphic Vision Systems, New sensing technologies complement standard vision system capabilities, enhancing occupant safety, enabling increased personalization, advancing today's in-cabin experience to tomorrow's third space experience (Apr. 21, 2021).

* cited by examiner

NEUROMORPHIC SENSOR IMPLEMENTATION IN AIRCRAFT CABIN ENVIRONMENTS

TECHNICAL FIELD AND BACKGROUND

The present disclosure relates generally to improvements to smart devices utilized in environments such as aircraft cabins, and more particularly, to the fusion of neuromorphic sensor technology and smart device modalities to expand and maximize the usage and functionality of smart devices.

Aircraft cabins are one environment type that benefits from the use of smart devices. Smart devices in such environments are generally equipped with sensor technologies configured to automate usage of the device according to a set of preprogrammed instructions. In some instances, the preprogrammed instructions may be as basic as turning on or off a device when a predetermined condition is met. In other instances, the preprogrammed instructions may be more complicated such as customized usage according to the user.

In an aircraft cabin environment, for example, smart devices may be utilized in the passenger cabin to control lighting systems, seat controls, climatization, media equipment, etc. In an aircraft lavatory, smart devices may be utilized to control lighting systems, ventilation, toilets, faucets, soap dispensers, etc. Galleys and crew quarters may also benefit from the use of smart devices, among other applications.

Infrared and proximity sensors are two modalities commonly incorporated in smart devices. Infrared sensors are devices configured to emit and detect infrared radiation in order to detect obstacles within range of the sensor. When implemented in a smart device in an aircraft cabin, an infrared sensor can be used to detect heat and motion of a passenger, without physical contact, to activate or deactivate a device according to a preprogrammed instruction. Proximity sensors operate in a similar manner by emitting an electromagnetic field or beam and determining a change in the field or return signal. Short range proximity sensors are commonly used in lavatory appliances as touchless switches for hygiene reasons.

Conventional smart devices that rely solely on proximity detection have limited use due to their inability to track the global context of passenger activities. Accordingly, it would be desirable to implement a further technology in conjunction with smart device modalities to provide better situational awareness of the environment in which smart devices operate to improve performance and use of the smart devices.

BRIEF SUMMARY

According to a first aspect, the present disclosure provides a system for implementation in an aircraft passenger cabin. The system includes a smart device, or in some instances a plurality of smart devices, including communication circuitry and a sensor configured to detect a condition change proximate the smart device. The system further includes a neuromorphic sensor positionable apart from the smart device, or in some instances a plurality of neuromorphic sensors, the neuromorphic sensor including communication circuitry, and the neuromorphic sensor configured to detect a condition change apart from the smart device. The system further includes a controller communicatively coupled to each of the smart device and the neuromorphic sensor, the controller including a processor configured to receive condition change information from each of the smart device and the neuromorphic sensor, coordinate the received condition change information, and instruct the smart device to operate, according to preprogrammed instructions, based on the received and coordinated condition change information.

In some embodiments, the sensor of the smart device is a proximity sensor configured to detect object movement proximate the smart device, and the neuromorphic sensor is configured to detect object movement in the aircraft passenger cabin, the detected object movement of the neuromorphic sensor out of range of detection of the sensor of the smart device.

In some embodiments, the aircraft passenger cabin is a passenger seating area including a passenger seat, the condition change associated with each of the sensor of the smart device and the neuromorphic sensor comprises passenger movement within the passenger seating area, the smart device is one of a lighting device, a seat control device, a climatization device, and a media device, and the neuromorphic sensor is positionable in the passenger seating area such that an imaging area of the neuromorphic sensor includes the passenger seat.

In some embodiments, the aircraft passenger cabin is a lavatory, the condition change associated with each of the smart device and the neuromorphic sensor comprises passenger movement, the smart device is one of a lighting device, a toilet, a climatization device, a ventilation device, a disinfection device, a faucet, and a soap dispenser, and the neuromorphic sensor is positionable to image substantially an entirety of the lavatory.

In some embodiments, the condition change associated with each of the smart device and the neuromorphic sensor comprises inanimate object movement, the smart device is an inanimate object configured to traverse at least one aisle of the aircraft passenger cabin, and the neuromorphic sensor is positionable in the aircraft passenger cabin such that an imaging area of the at least one neuromorphic sensor includes the at least one aisle.

In some embodiments, the smart device is a galley cart.

In some embodiments, the smart device is communicatively coupled to at least one other smart device, and the at least one other smart device is communicatively coupled to the controller.

In some embodiments, the neuromorphic sensor is communicatively coupled to at least one other neuromorphic sensor, the at least one other neuromorphic sensor is communicatively coupled to the controller, and each neuromorphic sensor is configured to image a predetermined area of the aircraft passenger cabin, wherein each predetermined area may or may not overlap at least one other predetermined area.

In some embodiments, the condition change comprises passenger movement and the neuromorphic sensor is incapable of capturing a visually recognizable identity of any person.

According to another aspect, the present disclosure provides a method of operating a smart device in an aircraft passenger cabin. The method includes providing a smart device in the aircraft passenger cabin including a sensor configured to detect object movement proximate the smart device, and providing a neuromorphic sensor in the aircraft passenger cabin, the neuromorphic sensor configured to detect object movement in the aircraft passenger cabin out of range of detection of the sensor of the smart device. The method further includes providing a controller communicatively coupled to each of the smart device and the neuromorphic sensor. The method continues with detecting, by the neuromorphic sensor, object movement in the aircraft passenger cabin, analyzing, by the controller, the detected object movement, and determining, by the controller, if the analyzed object movement is associated with use of the smart device. If the object movement is determined to be associated with the use of the smart device then, by the controller, the method continues with instructing the smart device to operate according to preprogrammed instructions of the smart device.

In some embodiments, the step of analyzing includes confirming object movement into or out of an imaging area of the neuromorphic sensor and/or confirming object movement toward or away from the smart device.

In some embodiments, the aircraft passenger cabin is a passenger seating area including a passenger seat, the smart device is one of a lighting device, a seat control device, a climatization device, and a media device, and the neuromorphic sensor is positionable in the passenger seating area such that an imaging area of the neuromorphic sensor includes the passenger seat.

In some embodiments, the aircraft passenger cabin is a lavatory, the smart device is one of a lighting device, a toilet, a climatization device, a ventilation device, a disinfection device, a faucet, and a soap dispenser, and the neuromorphic sensor is positionable overhead in the lavatory.

In some embodiments, the smart device is networked with at least one other smart device communicatively coupled to the controller, and use of the smart device and the at least one other smart device is coordinated according to preprogrammed instructions.

In some embodiments, the neuromorphic sensor is networked with at least one other neuromorphic sensor, each of the neuromorphic sensor and the at least one other neuromorphic sensor is configured to image a predetermined area of the aircraft passenger cabin, and each predetermined area may or may not overlap at least one other predetermined area.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
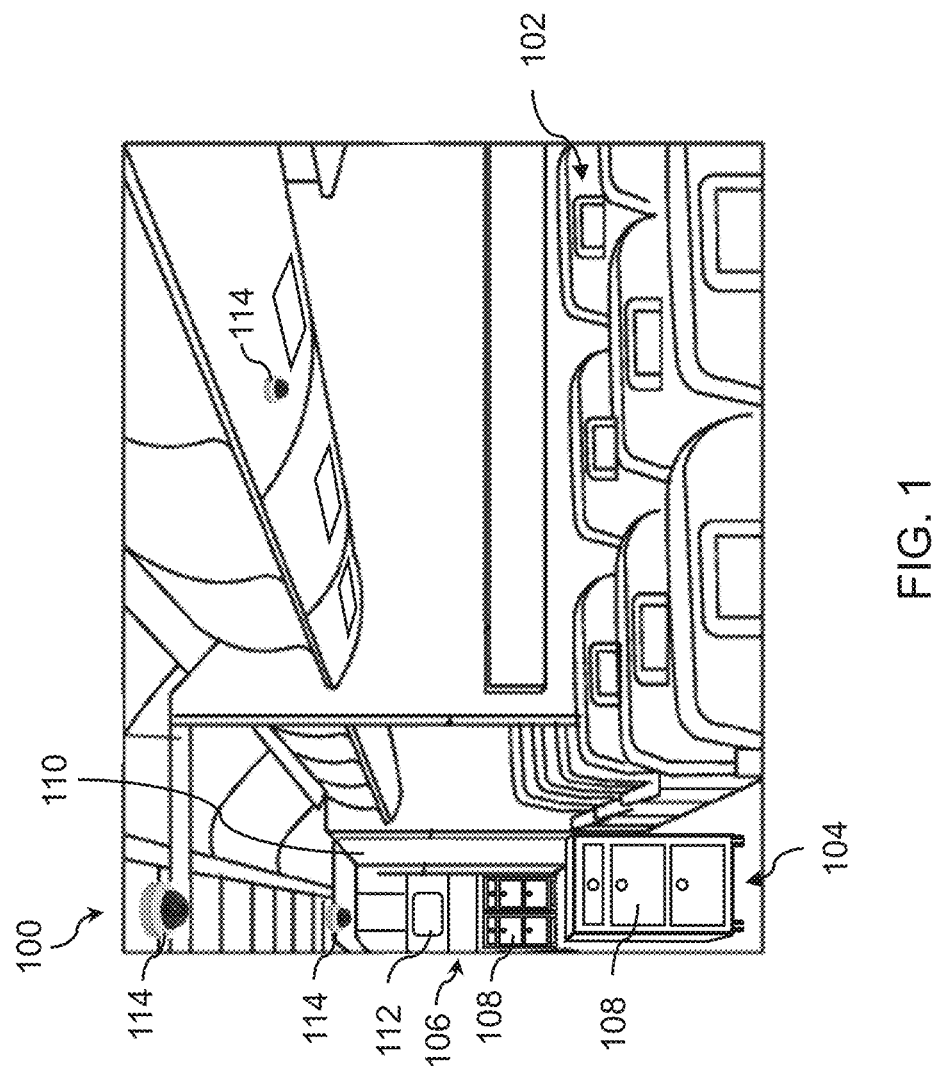
FIG. 1 is a schematic diagram illustrating a system according to the present disclosure implemented in a non-limiting example of an aircraft passenger cabin.

Reference will now be made in detail to the subject matter disclosed, which is illustrated in the accompanying drawings. Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the present disclosure provides systems and methods configured to be implemented in an active environment such as an aircraft passenger cabin. The systems described herein include at least one sensor of a particular type deployed in conjunction with at least one smart device provided in the environment. In use, the at least one sensor, such as a neuromorphic sensor, captures and outputs information regarding movements that occur in the environment such as inanimate object and passenger movements. The movements are then analyzed by the system, such as by a processor configured in a controller, and as they relate to use of a smart device, may be used to operate, improve, coordinate, and expand the functionalities and capabilities of the smart devices.

In embodiments, the at least one neuromorphic sensor is positioned apart from the at least one smart device such that object movement detection of the at least one neuromorphic sensor is out of range of detection of the at least one smart device. As such, the at least one neuromorphic sensor is configured to monitor the overall environment in which the at least one smart device operates whereas the smart device is configured to detect object movements proximate the at least one smart device and in range of an integrated sensor of the at least one smart device. In this regard, use of the at least one smart device may be according to detected movements proximate the at least one smart device, object movements apart from the at least one smart device, or a coordination of various detected object movements.

Environments that benefit from the systems and methods of the present disclosure include, but are not limited to, aircraft and other vehicle passenger cabins, seating areas and passenger suites within passenger cabins, lavatories, crew quarters, galleys, cockpits, etc. The systems may be utilized in other environments that include smart devices, wherein an additional sensor apart from the smart device itself may serve to expand the capabilities of the smart device.

Preferred sensor types suitable for use in the systems and methods of the present disclosure include neuromorphic sensors, also referred to herein as neuromorphic vision systems. Known to those skilled in the art, neuromorphic event-based camera sensors are imaging sensors configured to detect and track object movements in real time, with low latency, and with high sensitivity regardless of lighting conditions. In use, neuromorphic sensors respond to local changes in brightness as they occur and report those changes as changes in pixel intensities. Neuromorphic sensors do not capture and report color information nor do they report visually recognizable information. As such, the information obtained and reported by neuromorphic sensors makes them particularly well suited for use in areas wherein there is an expectation of privacy, such as lavatories, seating compartments, sleeping quarters, suites, etc.

The use of neuromorphic sensors in conjunction with the use of smart devices according to the present disclosure expands the capabilities of conventional smart devices. For example, improved smart devices according to the present disclosure may be enhanced in terms of use, application, range, coordination, etc.

FIG. 1 illustrates a non-limiting example of an aircraft passenger cabin within which systems and methods according to the present disclosure may be implemented. The passenger cabin 100 may be typical of a commercial airliner configured to carry a predetermined number of passengers. The illustrated passenger cabin 100 includes a plurality seat rows 102 separated by a center aisle 104 arranged parallel to the aircraft longitudinal axis. A galley 106 positioned proximate a forward end of the cabin is used by the cabin crew for food and beverage service. The galley 106 may include stowage for galley carts such as smart carts 108. A lavatory 110 may be positioned in the cabin.

Portions of the cabin environment may include at least one smart device. As used herein, the term "smart device" refers to an intelligent device including communication circuitry and sensing equipment included in the device or communicatively coupled thereto. In some embodiments, the smart device may be networked with a controller and at least one other smart device operating in the environment to coordinate functions. The smart device operates according to preprogrammed instructions. For example, sensing functionality may detect movement in close proximity to the smart device, and responsive to the sensed movement, the device operates according to the preprogrammed instructions. In a particular example, sensing equipment provided in the device may detect object movement relative to the sensing equipment which in turn causes the device to power on, whereas movement of the object away from the sensing equipment or expiration of a predetermined time period may cause the device to power off. Examples of such devices that operate according to the foregoing description include, but are not limited to, smart switches, entry detectors, and appliances. Smart switches, for example, may be electrically coupled to other devices such as components of lighting systems, seat actuation systems, climatization systems, media devices, etc. In use, a touchless smart switch operates to activate or inactivate a device responsive to movement sensed by the switch, obviating the need to operate the switch manually. In embodiments, smart device sensors may include proximity sensors incorporated into the device.

In an exemplary embodiment, a galley cart 108 may be configured as smart device. In use, a smart galley cart 108 may be configured to traverse an aisle to serve food and beverages to traveling passengers. Automated functionality of a smart galley cart 108 may include, but is not limited to, deployment, dispensing, payment and stowage. A smart galley cart 108 may be networked and communicatively coupled to a controller 112 configured to receive requests for service. When a request for service is received, a smart galley cart 108 may be deployed to satisfy the service request. In embodiments, the controller 112 is part of a crew display including an interface.

According to the present system, at least one neuromorphic sensor 114 may be positioned in the cabin to image a predetermined area of the cabin. A plurality of neuromorphic sensors 114 may be installed in a cabin environment that is large, complex in shape, includes obstacles such as walls, etc. Each neuromorphic sensor 114 is configured to image a predetermined area, and a predetermined area may overlap with at least one other area such that complete coverage is achieved. The controller 112, communicatively coupled to each neuromorphic sensor 114, may be configured to reconcile the received outputs from the sensors. In use, the sensors detect and report local changes in brightness in the environment corresponding to object movements. Object movements, such as animate (e.g., passenger) and inanimate (e.g., galley cart) movements are analyzed by the controller to determine an association with a use of at least one smart device.

Figure 2:
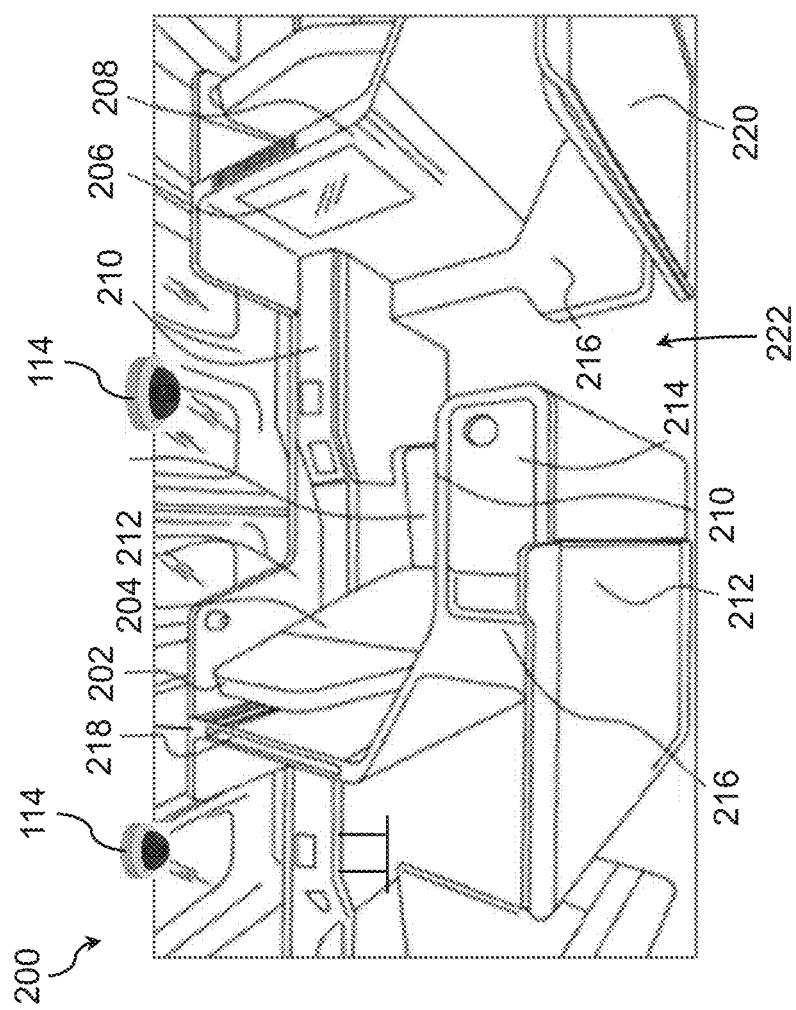
FIG. 2 is a schematic diagram illustrating a system according to the present disclosure implemented in a non-limiting example of a seating area in an aircraft passenger cabin.

FIG. 2 illustrates a non-limiting example, of a passenger suite in an aircraft in which systems and methods according to the present disclosure may be implemented. The illustrated passenger suite 200 includes a passenger seat 202 and at least one amenity such as a seat actuation system 204, climatization system internal to the seat or seating area, media device 206 for instance positioned in a partition wall 208, etc. The seating area 200 may include furniture such as consoles 210 housing controls, other partitions 212, compartments 214, tables 216, deployable partitions 218, doors 220, etc., each of which may include smart capability to automate a function responsive to a sensed condition change such as object movement.

The at least one amenity may be an intelligent device such that the device operates according to a programmed instruction based on a passenger position and or movement relative to the device. For example, the passenger seat 202 may include an actuation system for adjusting seat surfaces. Whereas a standard seat may be controlled via a control panel configured to receive user inputs, an intelligent seat system may adjust automatically according to passenger position and motion. Other intelligent devices may include seat climatization devices and cabin climatization devices. In some embodiments, the devices operate according to preprogrammed instructions based on passenger movements into, out of, and within the passenger suite.

The passenger suite 200 further includes at least one neuromorphic sensor 114 as described above. As shown, one neuromorphic sensor 114 is positioned in the suite generally overhead location such that the field of view of the sensor includes the passenger seat 202 and suite entrance 222. As such, the at least one neuromorphic sensor 114 is positioned to detect movements associated with the passenger, seat, door, window shades, meal table, etc. In this regard, the neuromorphic sensor 114 detects changes associated with the passenger, seat recline, door position, window shade deployment, meal table deployment, etc. Such condition changes, determined by object movements, are analyzed by a system controller and utilized to carry out the preprogrammed instructions of the at least one smart device. The controller, for example, may be incorporated into the display monitor or other seat control panel.

Operation of the smart devices within the passenger suite 200 may be coordinated. For example, a waking motion of the passenger determined by a change in position from horizontal to upright, as reported by the at least one neuromorphic sensor 114, may be considered by the controller to coordinate the seat actuation system in returning the seat to the upright sitting position, changing the lighting conditions in terms of intensity and/or color, opening the window shades, etc. The controller may instruct networked smart devices to operate in reverse when the passenger movement indicates a change from awake to sleeping. Whereas conventional passenger suites may be equipped with a door entry sensor for activating certain devices when a passenger enters or exits a suite, the at least one neuromorphic sensor captures object movements within the suite for better situational awareness without capturing visually recognizable information considered an invasion of privacy to the passenger.

Figure 3:
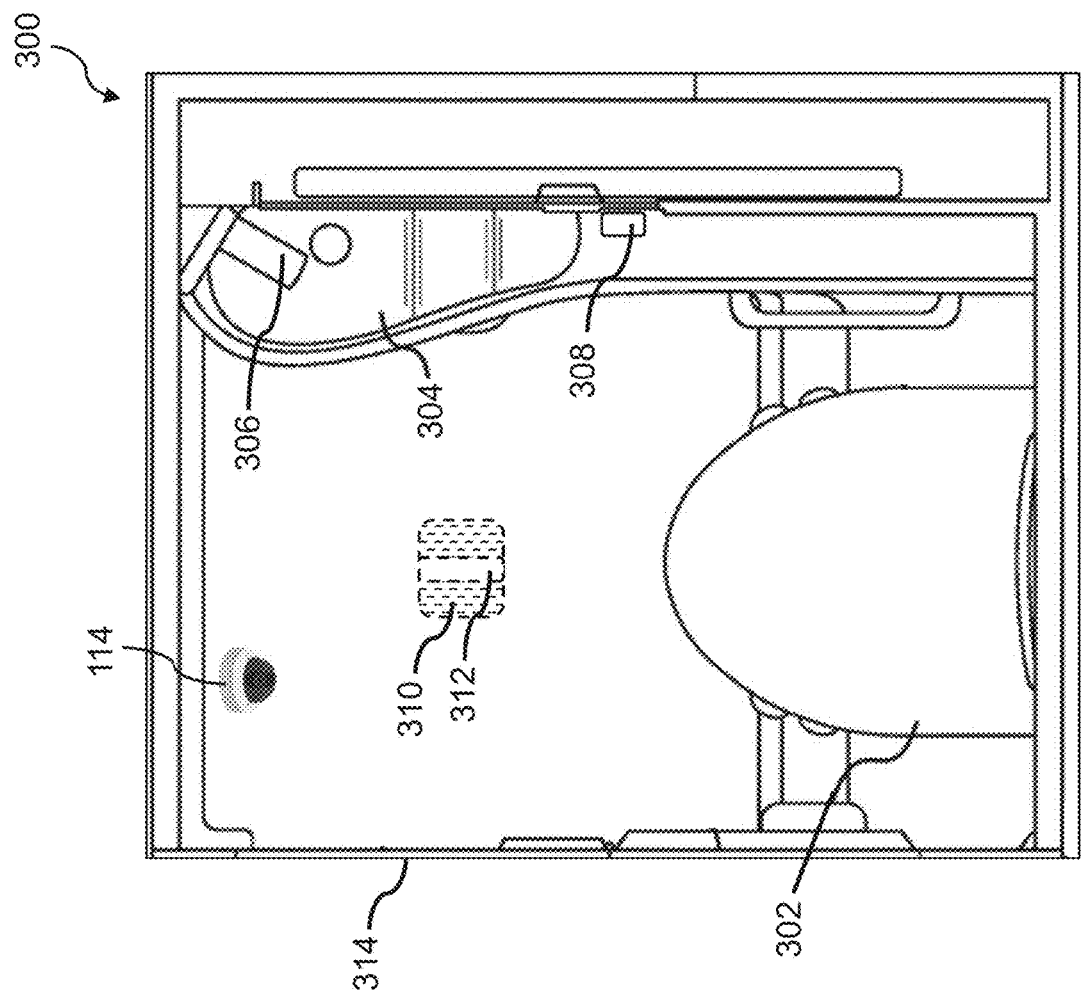
FIG. 3 is a schematic diagram illustrating a system according to the present disclosure implemented in a non-limiting example of a lavatory in an aircraft passenger cabin.

FIG. 3 illustrates an example of a lavatory in which systems and methods according to the present disclosure may be implemented. A lavatory is a place where privacy is expected and thus is an ideal application for neuromorphic sensors. The illustrated lavatory 300 includes a toilet 302, sink 304 with faucet 306, soap dispenser 308, fan 310 with fan light 312, door 314, etc., each of which may be configured as a smart device wherein at least one function is automated. The lavatory 300 may further include additional smart devices such as lighting systems, climatization systems, fragrance systems, etc. The at least one smart device operates according to a programmed instruction based on passenger or object movements relative to the device. For example, the toilet 302 may flush automatically when the toilet senses object movement away from the toilet, the faucet 304 may turn on when object motion proximate the sensor is sensed, and the same for the soap dispenser.

The lavatory 300 further includes at least one neuromorphic sensor 114 as discussed above. As shown, a sensor 114 may be positioned overhead in the lavatory such that passenger movement into, out of, and within the lavatory can be detected. As such, the at least one sensor 114 is capable of detecting movements associated with the use of the entry door, toilet, faucet, and soap dispenser. In this regard, the output of the neuromorphic sensor 114 can be considered by the device controller to activate or deactivate any of the foregoing smart devices based on the anticipated actions of the passenger, and the device operations can be coordinated in any predetermined manner. Thus, in contrast to conventional smart devices that operate alone and only when close proximity is sensed, the systems and methods according to the present disclosure are configured to utilize object movements to anticipate the needs of a passenger such that devices can be operated to meet those needs, without decision making and action on the part of the passengers.

The above-described examples are not intended to be limited or exhaustive of the possible applications for the systems and methods of the present disclosure, and it is envisioned and intended that other environments and applications may benefit from the above-described aspects such as security applications and monitoring the general state of an environment.

Figure 4:
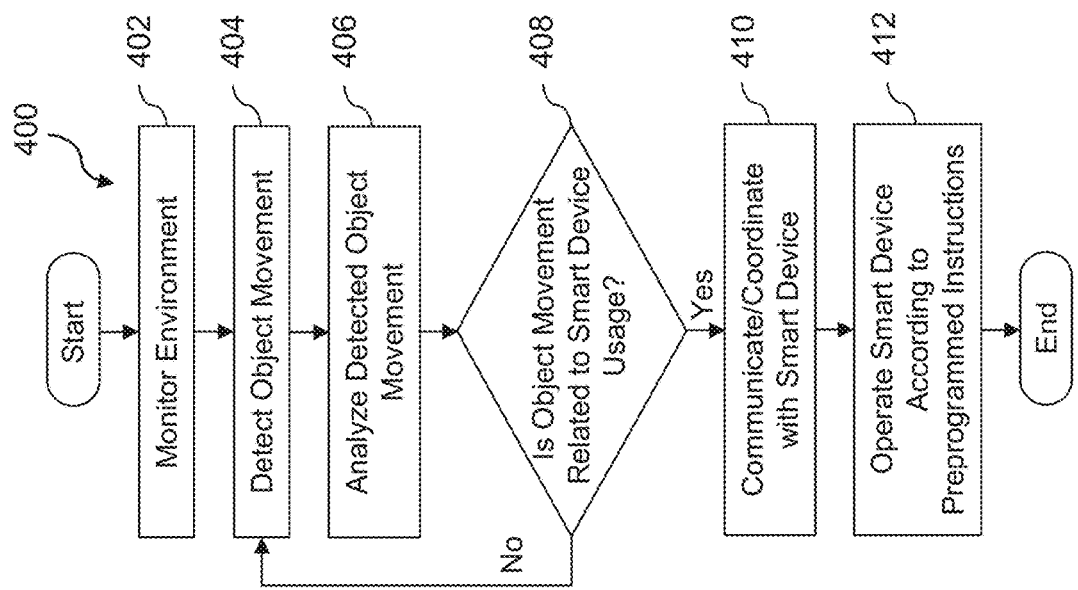
FIG. 4 is a flow chart illustrating a method according to the present disclosure.

FIG. 4 is a flowchart illustrating a method 400 for operating at least one smart device in an environment such as an aircraft passenger cabin. In a Step 402, the general environment is continuously monitored by at least one neuromorphic sensor as described above. In a Step 404, movements such as passenger movements and inanimate object movements are detected by the at least one neuromorphic sensor. In a Step 406, outputs from the at least one neuromorphic sensor are analyzed by the controller including the processor, wherein the controller is communicatively coupled to the at least one neuromorphic sensor. In a Step 408, the controller determines if the analyzed object movements are associated with use at least one smart device further communicatively coupled to the controller. In a Step 410, if the movements are confirmed to be associated with the use of the at least one smart device, the controller communicates with the at least one smart device. In a Step 412, the smart device then operates according to preprogrammed instructions. Movements determined not to be associated with the at least one smart device may be disregarded or used by another system such as an environment monitoring system.

The controller may be a digital computer that, in terms of hardware architecture, generally includes a processor, input/output (I/O) interfaces, a network interface, a data store, and memory. It should be appreciated by those of ordinary skill in the art that a practical embodiment of a controller may include additional components and suitably configured processing logic to support known or conventional operating features that are not described in detail herein. The components are communicatively coupled via a local interface. The local interface may be, for example but not limited to, one or more buses or other wired or wireless connections, as is known in the art. The local interface may have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

The processor may be a hardware device for executing software instructions. The processor may be any custom made or commercially available processor, a central processing unit (CPU), an auxiliary processor among several processors associated with the server, a semiconductor-based microprocessor (in the form of a microchip or chip set), or generally any device for executing software instructions. When the controller is in operation, the processor is configured to execute software stored within the memory, to communicate data to and from the memory, and to generally control operations of the server pursuant to the software instructions. The I/O interfaces may be used to receive input from and/or for providing system output to one or more devices. I/O interfaces may include, for example, a serial port, a parallel port, a small computer system interface (SCSI), a serial ATA (SATA), a fibre channel, Infiniband, iSCSI, a PCI Express interface (PCI-x), an infrared (IR)

interface, a radio frequency (RF) interface, and/or a universal serial bus (USB) interface.

A network interface may be used to enable the controller to communicate on a network, such as a wide area network (WAN), a local area network (LAN), and the like, etc. The network interface may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface may include address, control, and/or data connections to enable appropriate communications on the network.

A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The radio enables wireless communication to an external device or network. Any number of suitable wireless data communication protocols, techniques, or methodologies can be supported by the radio, including, without limitation: RF; IrDA (infrared); Bluetooth; ZigBee (and other variants of the IEEE 802.15 protocol); IEEE 802.11 (any variation); IEEE 802.16 (WMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); Land Mobile Radio (LMR); Digital Mobile Radio (DMR); Terrestrial Trunked Radio (TETRA); Project 25 (P25); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

Although the disclosure has been described with reference to the embodiments illustrated in the attached drawing figures, equivalents may be employed and substitutions made herein without departing from the scope of the claims.

What is claimed is:

1. A system for implementation in an aircraft passenger cabin, comprising:
   a smart device including communication circuitry and a sensor, having a first range of detection relative to the smart device, configured to detect a condition change proximate the smart device, within the first range of detection;
   a neuromorphic event-based camera sensor, being a sensor that does not capture and report color information or report visually recognizable information, positioned apart from the smart device, the neuromorphic event-based camera sensor including communication circuitry, and the neuromorphic event-based camera sensor configured to detect a condition change apart from the smart device in a second range of detection greater than or outside of the first range of detection; and
   a controller communicatively coupled to each of the smart device and the neuromorphic event-based camera sensor, the controller including a processor configured to receive condition change information from each of the smart device and the neuromorphic event-based camera sensor, coordinate the received condition change information, and instruct the smart device to operate an actuator or an aircraft lighting system, according to preprogrammed instructions, based on the received and coordinated condition change information.

2. The system according to claim 1, wherein:
   the sensor of the smart device is a proximity sensor configured to detect object movement proximate the smart device; and
   the neuromorphic event-based camera sensor is configured to detect object movement in the aircraft passenger cabin, the detected object movement of the neuromorphic event-based camera sensor out of a range of detection of the sensor of the smart device.

3. The system according to claim 1, wherein:
   the aircraft passenger cabin is a passenger seating area including a passenger seat;
   the condition change associated with each of the sensor of the smart device and the neuromorphic event-based camera sensor comprises passenger movement within the passenger seating area;
   the smart device is one of a lighting device, a seat control device, a climatization device, and a media device; and
   the neuromorphic event-based camera sensor is positioned in the passenger seating area such that an imaging area of the neuromorphic event based camera sensor includes the passenger seat.

4. The system according to claim 1, wherein:
   the aircraft passenger cabin is a lavatory;
   the condition change associated with each of the smart device and the neuromorphic event-based camera sensor comprises passenger movement;
   the smart device is one of a lighting device, a toilet, a climatization device, a ventilation device, a disinfection device, a faucet, and a soap dispenser; and
   the neuromorphic event-based camera sensor is positioned to image the lavatory.

5. The system according to claim 1, wherein:
   the condition change associated with each of the smart device and the neuromorphic event-based camera sensor comprises inanimate object movement;

the smart device is an inanimate object configured to traverse at least one aisle of the aircraft passenger cabin; and the neuromorphic event-based camera sensor is positioned in the aircraft passenger cabin such that an imaging area of the at least one neuromorphic event-based camera sensor includes the at least one aisle.

6. The system according to claim 5, wherein the smart device is a galley cart.

7. The system according to claim 1, wherein:
the smart device is communicatively coupled to at least one other smart device; and
the at least one other smart device is communicatively coupled to the controller.

8. The system according to claim 1, wherein:
the neuromorphic event-based camera sensor is communicatively coupled to at least one other neuromorphic event-based camera sensor;
the at least one other neuromorphic event-based camera sensor is communicatively coupled to the controller; and
each neuromorphic event-based camera sensor is configured to image a predetermined area of the aircraft passenger cabin, wherein each predetermined area may or may not overlap at least one other predetermined area.

9. The system according to claim 1, wherein the condition change comprises passenger movement.

10. A method of operating a smart device in an aircraft passenger cabin, comprising:
providing a smart device in the aircraft passenger cabin, the smart device including a sensor configured to detect object movement proximate the smart device within a first range of detection relative to the smart device;
providing a neuromorphic event-based camera sensor in the aircraft passenger cabin, the neuromorphic event-based camera sensor being a sensor that does not capture and report color information or report visually recognizable information and configured to detect object movement in the aircraft passenger cabin out of range of detection of the sensor of the smart device;
providing a controller communicatively coupled to each of the smart device and the neuromorphic event-based camera sensor;
detecting, by the neuromorphic event-based camera sensor, object movement in the aircraft passenger cabin;
analyzing, by the controller, the detected object movement;
determining, by the controller, if the analyzed object movement is associated with use of the smart device; and
if the object movement is determined to be associated with the use of the smart device then, by the controller, instructing the smart device to operate an actuator or an aircraft lighting system according to preprogrammed instructions of the smart device.

11. The method according to claim 10, wherein the step of analyzing comprises confirming object movement into or out of an imaging area of the neuromorphic event-based camera sensor and/or confirming object movement toward or away from the smart device.

12. The method according to claim 10, wherein:
the aircraft passenger cabin is a passenger seating area including a passenger seat;
the smart device is one of a lighting device, a seat control device, a climatization device, and a media device; and
the neuromorphic event-based camera sensor is positioned in the passenger seating area such that an imaging area of the neuromorphic event-based camera sensor includes the passenger seat.

13. The method according to claim 10, wherein:
the aircraft passenger cabin is a lavatory;
the smart device is one of a lighting device, a toilet, a climatization device, a ventilation device, a disinfection device, a faucet, and a soap dispenser; and
the neuromorphic event-based camera sensor is positioned overhead in the lavatory.

14. The method according to claim 10, wherein:
the smart device is networked with at least one other smart device communicatively coupled to the controller; and
use of the smart device and the at least one other smart device is coordinated according to preprogrammed instructions.

15. The method according to claim 10, wherein:
the neuromorphic event-based camera sensor is networked with at least one other neuromorphic event-based camera sensor;
each of the neuromorphic event-based camera sensor and the at least one other neuromorphic event-based camera sensor is configured to image a predetermined area of the aircraft passenger cabin; and
each predetermined area may or may not overlap at least one other predetermined area.

* * * * *